W. G. VINCENT.
Hog-Trough.

No. 225,309.　　　　Patented Mar. 9, 1880.

Witnesses:
Fred G. Dieterich
B. L. Dieterich

Inventor:
William G. Vincent
by Louis Bagger Jr.
his attorneys

UNITED STATES PATENT OFFICE.

WILLIAM G. VINCENT, OF COLUMBIA, IOWA.

HOG-TROUGH.

SPECIFICATION forming part of Letters Patent No. 225,309, dated March 9, 1880.

Application filed December 15, 1879.

*To all whom it may concern:*

Be it known that I, WILLIAM G. VINCENT, of Columbia, in the county of Marion and State of Iowa, have invented certain new and useful Improvements in Hog-Troughs; and I do hereby declare that the following is a full, clear, and exact description of the invention, which will enable others skilled in the art to which it appertains to make and use the same, reference being had to the accompanying drawings, which form a part of this specification, and in which—

Figure 1:
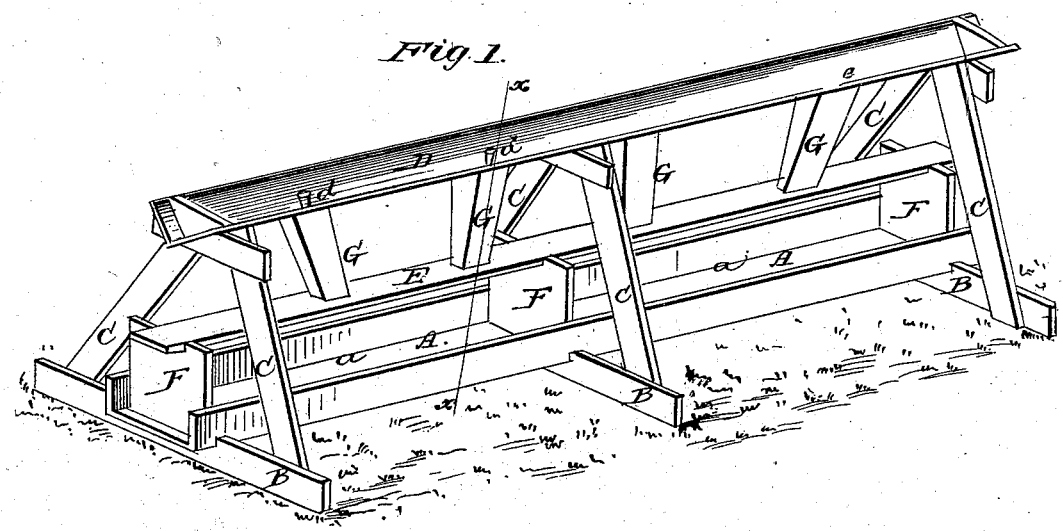
Figure 2:
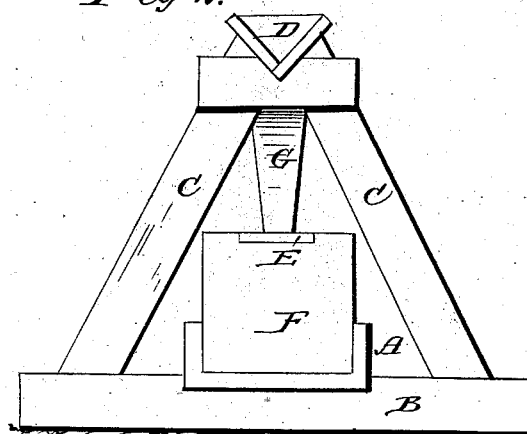
Figure 3:
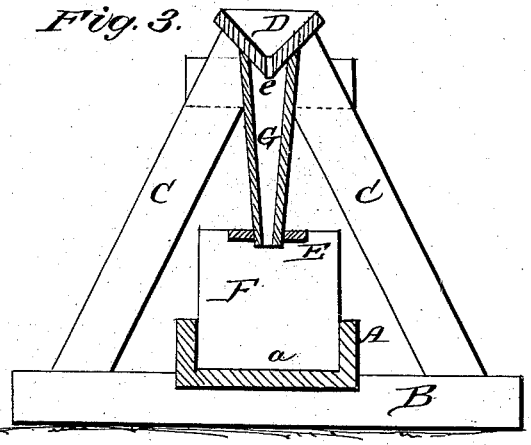

Figure 1 is a perspective view. Fig. 2 is an end view; and Fig. 3 is a transverse section through line $x\,x$, Fig. 1.

Similar letters of reference indicate corresponding parts in all the figures.

This invention has relation to devices for feeding hogs and other animals; and it consists in the improvements hereinafter described, and particularly pointed out in the claim.

In the drawings, A is a trough, of any suitable length and about twelve inches wide and four inches deep, elevated a short distance above the ground upon bars B B, which extend on both sides of the trough.

C C are slanting side pieces or braces, the upper converging ends of which support the elevated trough D, which is triangular in cross-section, and of a length corresponding to that of the lower trough, A. This upper triangular trough, D, is elevated, by the inclined standards C C, from two and a half to three feet above the ground, and between the troughs D and A is placed a flat bar, E, supported upon vertical partitions F, by which the lower trough is divided into a series of compartments, $a\,a$. This flat bar E should be of such width and placed at such a distance above the lower trough, A, that the hogs will have sufficient room to eat and drink out of the trough at each side thereof, but cannot get into it.

G G are spouts or tubes, which reach from the upper trough, D, down to and through the flat bar or partition E, the upper trough having a series of apertures, $e$, in the bottom, which register with said spouts, and may be closed, if desired, by plugs or stoppers $d$.

From the foregoing description, taken in connection with the drawings, the operation and advantages of my improved hog-trough will readily be understood. The swill to be fed to the hogs is placed in the upper trough, D, and fed through the spouts G G down into the lower trough, A.

By plugging up the openings in the upper trough, this in itself may serve as a feeding-trough for feeding grain to cows, calves, and other stock, out of reach of the hogs, who can have access to the lower trough only.

This trough can be made at a small cost by any farmer, is strong and durable, and not liable to get out of repair.

Having thus described my invention, I claim and desire to secure by Letters Patent of the United States—

A trough for feeding hogs and other stock, composed of a lower trough, A, supported upon cross-bars B B, and provided with partitions F F, inclined supports C C, upper trough, D, provided with apertures $e$, flat bar E, and feed-spouts G G, all constructed and combined substantially as and for the purpose herein shown and specified.

In testimony that I claim the foregoing as my own I have hereto affixed my signature in presence of two witnesses.

WILLIAM G. VINCENT.

Witnesses:
JAMES HUFFMAN,
A. C. FOOT.